(12) United States Patent
Lindner

(10) Patent No.: US 6,167,995 B1
(45) Date of Patent: Jan. 2, 2001

(54) RELEASE MECHANISM FOR A MOTOR VEHICLE FRICTION CLUTCH

(75) Inventor: Joachim Lindner, Hambach (DE)

(73) Assignee: Mannesmann Sachs AG, Schweinfurt (DE)

(*) Notice: Under 35 U.S.C. 154(b), the term of this patent shall be extended for 0 days.

(21) Appl. No.: 09/305,530

(22) Filed: May 5, 1999

(30) Foreign Application Priority Data

May 18, 1998 (DE) ............................................. 198 22 285

(51) Int. Cl.⁷ ............................ B60K 41/22; F16D 25/08
(52) U.S. Cl. ..................... 192/3.57; 192/30 W; 192/91 A
(58) Field of Search ................................ 192/3.57, 3.63, 192/91 A, 85 CA, 30 W, 70.25, 111 A

(56) References Cited

U.S. PATENT DOCUMENTS

| 4,274,521 | 6/1981 | Cadeddu . | |
|---|---|---|---|
| 4,683,996 | * 8/1987 | Hattori et al. | 477/80 |
| 5,235,898 | * 8/1993 | Delin et al. | 192/111 A |
| 5,794,752 | * 8/1998 | Baer et al. | 192/85 CA |
| 5,950,788 | * 9/1999 | Willert et al. | 192/85 CA |

FOREIGN PATENT DOCUMENTS

| 197 16 600 A1 | 12/1997 | (DE) . |
|---|---|---|
| 030 349 | 6/1981 | (EP) . |

* cited by examiner

Primary Examiner—Rodney H. Bonck
(74) Attorney, Agent, or Firm—Cohen, Pontani, Lieberman & Pavane

(57) ABSTRACT

A release mechanism for a motor vehicle friction clutch for cooperation with a motor vehicle transmission having subdivided switching steps. The mechanism includes a release member displaceable by a compressed air for carrying out a clutch release process, a valve arrangement for selectively supplying the compressed air, and a measurement arrangement for detecting an actual release position of the release member. The valve arrangement carries out the application of pressure fluid to the release member in accordance with (1) a reference variable provided by an actuation arrangement and which represents a reference release position of the release member, and (2) the detected actual release position. The measurement arrangement is so constructed that when the detected actual release position exceeds a predetermined switching threshold release position, a shifting signal is provided for shifting the transmission in subdivided switching steps.

18 Claims, 3 Drawing Sheets

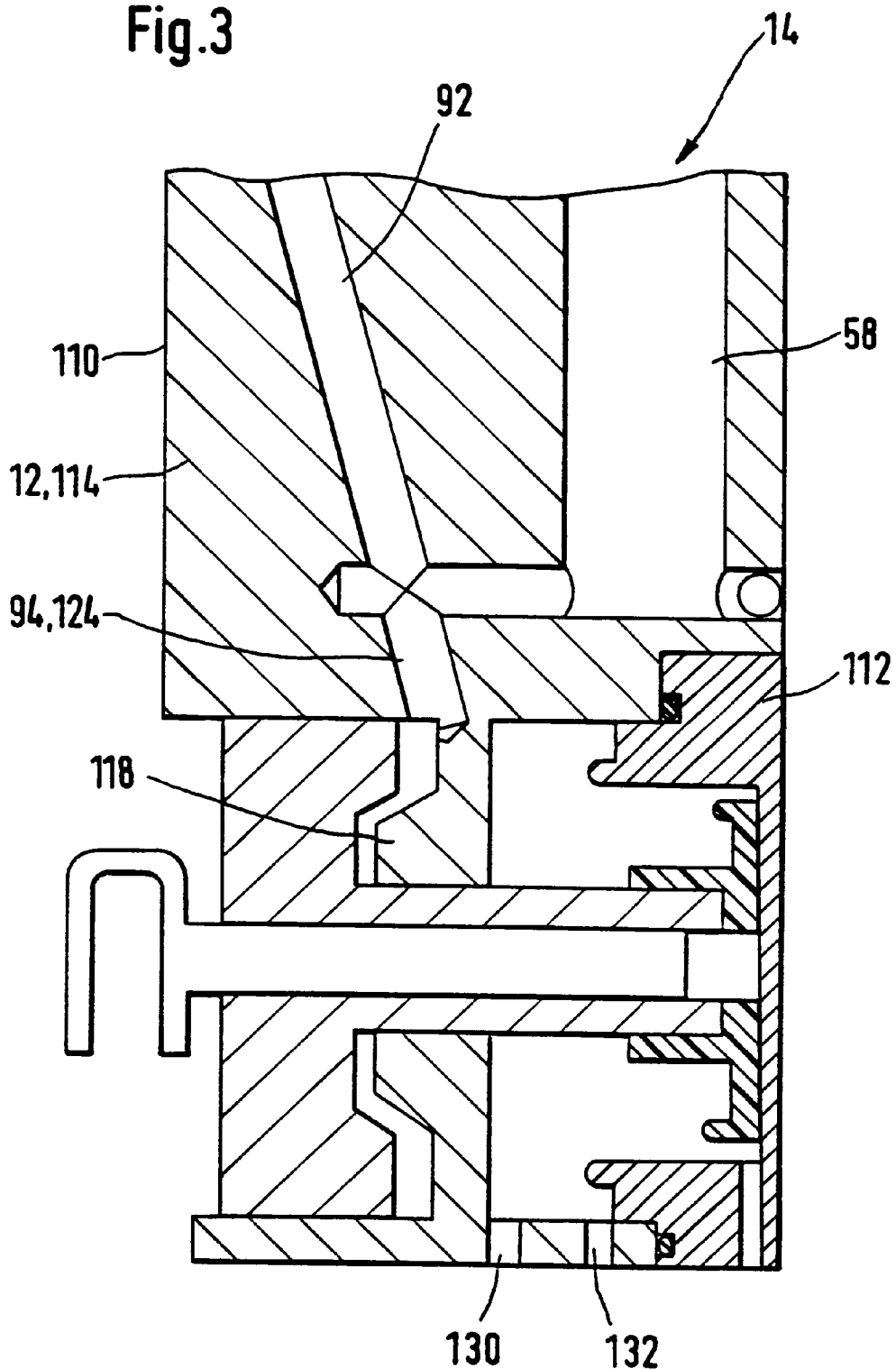

RELEASE MECHANISM FOR A MOTOR VEHICLE FRICTION CLUTCH

BACKGROUND OF THE INVENTION

1. Field of the Invention

The present invention relates to clutch release mechanisms for a motor vehicle friction clutch for use with a motor vehicle transmission, especially commercial or utility vehicle transmissions, with subdivided shifting or switching steps. More particularly, the present invention relates to a release mechanism actuatable by compressed air.

2. Description of the Related Art

A release mechanism is known from German patent publication DE 197 16 600 A1. This known release mechanism in which the releasing force is generated by air pressure and the extent of the release actuation is predetermined by a hydraulic system coupled with a clutch pedal is basically constructed for use with vehicle transmissions, especially in commercial or utility vehicle transmissions, which are constructed with or without subdivided switching steps. Transmissions in which the switching steps are subdivided comprise a subdivided stage which can be switched on or off as desired by the driver or an intermediate gear by means of which the switching steps, provided per se, can be switched by, for example, a half switching step. Thus, for example, when the subdivided stage is not activated switching can be carried out in the following gear sequence: $1^{st}$, $2^{nd}$, $3^{rd}$, etc. When the subdivided stage or intermediate gear is activated, the gears are then displaced by, for example, a half switching step, so that shifting can be carried out in the following gear sequence: 1½. . . 2½. . . 3½, etc. When the subdivided shifting stages or intermediate gears are selectively switched on or off, it is important to ensure that the motor vehicle clutch is in its fully released state for carrying out this shifting process. This requires accurate detection of the release state. For example, an electric switch can be arranged at the clutch pedal, so that the electric switch is activated when the clutch pedal is completely depressed and initiates shifting through the shifting stages. However, a problem associated with this mechanism is that there is no exact relationship between clutch pedal actuation and the actual release state in the case of air pressure actuation of the clutch, so that even when the clutch switch initiates shifting, it is possible that the clutch is not yet in its fully released state.

SUMMARY OF THE INVENTION

It is therefore an object of the present invention to provide a release mechanism for a friction clutch in a motor vehicle which has none of the problems cited above. The release mechanism may be employed in a motor vehicle transmission such as, for example, a commercial or utility vehicle transmission with subdivided switching steps. By means of the inventive release mechanism, the release position required for initiating the shifting processes of the transmission can be detected in a reliable and assured manner.

According to one aspect of the invention, this object is met by a release mechanism for a friction clutch of a motor vehicle transmission, particularly a commercial or utility vehicle transmission, with subdivided switching steps and which includes the following: a release member which is displaceable by means of application of compressed air for carrying out release processes, a valve arrangement for selective supply of compressed air for acting upon the release member, a measurement arrangement for detecting an actual release position of the release member. The valve arrangement carries out the application of pressure medium on the release member depending on (1) a reference variable which is provided by an actuation arrangement and which represents a reference release position of the release member, and (2) the detected actual release position.

According to another aspect of the invention, there is provided a measurement arrangement constructed in such a way that when the detected actual release position exceeds a predetermined switching threshold release position, a shifting signal is provided for shifting the subdivided switching steps.

According to still another aspect of the present invention, the measurement arrangement which is provided in this release mechanism in any case is accordingly used simultaneously to indicate when a predetermined release position has been reached in which shifting can be initiated insofar as a shifting command has been given by the driver of the vehicle. That is, there is no need to provide separate sensors or other detection elements which detect the instantaneous release position or which allow direct conclusions concerning the instantaneous release position. Since the release position of the release member can be detected by the measurement arrangement in a certain and very precise manner, the shifting process can, if desired, also be carried out in a precise manner when the desired release position exists.

In one embodiment of the release mechanism according to the invention, it is preferably provided that the shift signal is reproduced by a shifting force for shifting the subdivided switching steps. This means that a force is delivered directly by means of the measurement arrangement when the shifting can be carried out, wherein this force is then utilized simultaneously and preferably directly for carrying out these shifting processes.

For example, the measurement arrangement may include a switch device which adjusts a supply of pressure fluid generating the shifting force depending on the detected actual position.

The switch device preferably comprises:

(1) a pressure fluid feed in fluid communication with a pressure fluid source;

(2) a pressure fluid outlet for communicating pressure fluid supplied from the pressure fluid source to the transmission; and (3) a valve unit which provides a fluid connection between the pressure fluid inlet and the pressure fluid outlet when the detected actual release position exceeds the switching threshold release position.

Therefore, in accordance with the detected release position, fluid pressure can be communicated from the pressure fluid source at an appropriate point in time and the shifting process can be triggered by corresponding shifting commands.

The valve device preferably includes:

(1) a valve element which is pretensioned or resiliently urged toward at closing position in which the pressure fluid connection between the pressure fluid inlet and the pressure fluid outlet is interrupted or otherwise disconnected; and (2) a valve actuation element which is movable or displaceable in accordance with the actual release position and through which the valve element can be moved into an open position so as to define the pressure fluid connection between the pressure fluid feed and the pressure fluid outlet when the predetermined switching threshold release position is exceeded.

In order to relieve this pressure fluid system, it is proposed that the valve device also has a pressure fluid discharge which is in fluid communication with the pressure fluid outlet for discharging pressure fluid to a reservoir, the surroundings or the like when there is no pressure fluid connection between the pressure fluid inlet and the pressure fluid outlet.

The construction of the valve device in the release mechanism according to the invention can be simplified in that the valve actuation element acts on the valve element when the predetermined switching threshold release position has been reached and, in so doing, interrupts the fluid connection between the pressure fluid discharge and the pressure fluid outlet and, when further displaced, the valve actuation element carries along the valve element against its pretensioning for producing the pressure fluid connection between the pressure fluid inlet and the pressure fluid outlet. This means that an additional valve function can even be integrated in the valve device by means of the cooperation between the valve actuation element and the valve element.

When the pressure fluid is compressed air, the existing pneumatic system in utility vehicles can be utilized in a simple manner to provide the shifting force for carrying out the shifting processes. Further, the use of compressed air for generating the shifting force has the advantage that wear due to advanced operating age and which typically leads to leakage of fluid will not result in detrimental impairment of the function of the entire system since leakage of compressed air can be tolerated to a certain extent.

As is well known, different components of motor vehicle clutches wear out during operation, especially the clutch friction linings at the clutch disk or disks. As the friction linings wear out, the pressure plate or plates move increasingly closer to the flywheel in the engaged position during operation, so that the installed position of the diaphragm spring and the position of the release member are also changed. In order to precisely detect the presence of certain release positions, especially the presence of a switching threshold release position, the detection should not be impaired by a changed installation position of various components in the manner described above. Accordingly, it is suggested that a wear compensation arrangement is associated with the measurement arrangement for detecting the actual release position without being impaired by the wear of the clutch friction linings or the like.

For this purpose, there is provided, for example, a measurement arrangement comprising a measurement piston which is displaceable in a measurement cylinder and which is coupled to the release member by a coupling element for coupled movement. A volume defined by the measurement piston and the measurement cylinder corresponds to the actual release position. The coupling element is in frictional engagement with the measurement piston and is displaceable with respect to the measurement piston and against the friction engagement when wear occurs.

The measurement piston is preferably fixedly connected to the valve actuation arrangement.

The predetermined switching threshold release position preferably lies in the vicinity of the maximum release position.

In order to carry out shifting processes only when it is desired by the driver of the vehicle or when it is required by a control program running in a drive system management arrangement, an electronic shift initiating unit is proposed. In one embodiment, the shift initiating unit is configured for receiving shift commands and for picking up shift signals.

Depending on the received shift command, the shift initiating unit conveys the received shift signal in the shift command of corresponding type to the transmission.

In a particularly preferred embodiment, the release member comprises a release ring piston which is constructed substantially concentric to an axis of rotation and which is displaceable in an annular cylinder arrangement in the direction of the axis of rotation so that the entire release mechanism can be integrated in a housing cover of a motor vehicle clutch.

In order to detect the instantaneous release position with high precision by means of the measurement arrangement, it is proposed that the actuation arrangement comprises a hydraulic fluid system which is connected with the valve arrangement on the one hand and with the measurement arrangement on the other hand and that the valve arrangement carries out the application of compressed air to the release member corresponding to the hydraulic fluid pressure prevailing in the hydraulic fluid system.

The present invention is further directed to a transmission shifting switch arrangement for shifting the subdivided switching steps of a shift transmission, wherein the transmission shifting switch arrangement comprises a valve unit for selectively supplying pressure fluid, preferably compressed air, to the transmission for generating a shifting force. The transmission shifting switch arrangement is preferably incorporated in a measurement cylinder arrangement through which a release position of a clutch actuation arrangement and/or a release member can be detected.

The present invention is described in more detail in the following with reference to the accompanying drawings showing preferred embodiments.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the several views:

FIG. 3 shows the integration of the measurement piston in a housing.

DETAILED DESCRIPTION OF THE PRESENTLY PREFERRED EMBODIMENTS

Figure 1:
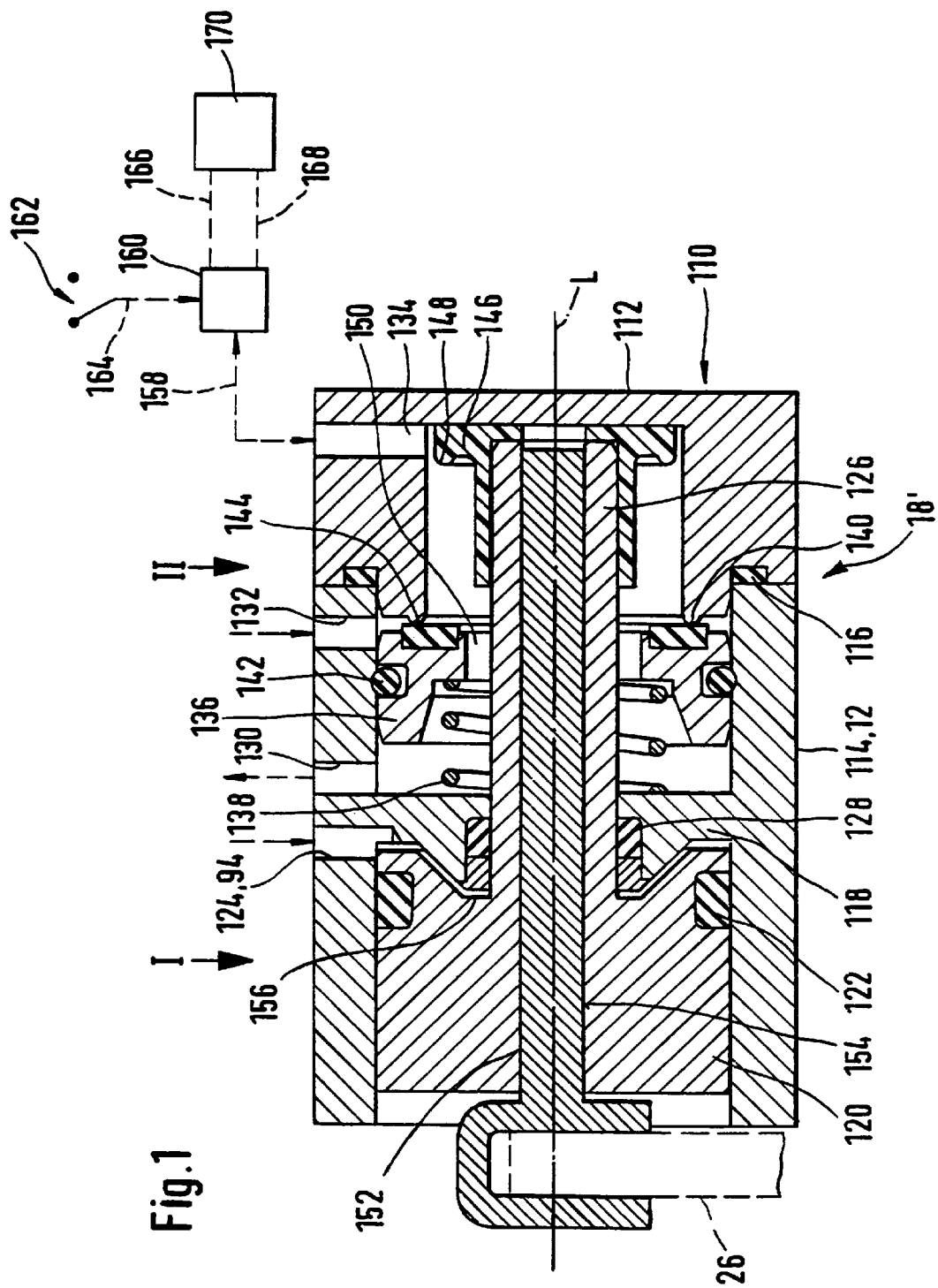
FIG. 1 is a partial longitudinal sectional view of release mechanism and an embodiment of the measurement arrangement for detecting release position of a clutch in which measurement arrangement a switch is integrated for shifting a transmission with subdivided gears.

Initially, the construction and manner of functioning of an embodiment of release mechanism 10 in accordance with the present invention, as is preferably used in commercial or utility vehicles, will be described with reference to FIG. 2. As shown, the release mechanism 10 is constructed in such a way that it encloses an axis of rotation A of a motor vehicle clutch (not shown) so as to be substantially concentric thereto and different components of the clutch are also constructed concentrically with respect to the axis of rotation A.

Visible from the outside is a housing 12 of the release mechanism 10 in which a valve arrangement 14, described in the following, is incorporated. A measurement arrangement 16 which has a measurement piston 18 which is displaceable in the direction of the axis of rotation A is located radially inside of the valve arrangement 14. The measurement piston 18 is arranged in a measurement cylinder 20 that is formed in the housing 12 and opens toward one axial side. The measurement piston 18 is sealed toward the inner circumferential wall of the cylinder 20 by a sealing element 22. At its end projecting from the cylinder 20, the measurement piston 18 is coupled with or connected to an annular release member or piston 26 through a groove 24. The release piston 26 is displaceable or movably disposed in the direction of the axis of rotation A in an annular release cylinder arrangement 28. This release cylinder arrangement is formed by a carrier part 30 which is connected with the housing 12 so as to be fixed with respect to rotation relative to it and is substantially T-shaped in longitudinal section and by a wall 32 which is likewise fixedly connected with the housing 12. The carrier part 30 forms a base 34 of the release cylinder arrangement 28 and a wall 36 which defines the annular release cylinder arrangement on the radial inside. A cylinder space or chamber 38 is defined by the walls 32, 36, the base 34 and the release piston 26, wherein compressed air can be introduced into the cylinder space or chamber 38 in a manner that will be described hereinafter. In order to provide a tight closure of this cylinder space 38, a sealing lip 40 is provided in the radial outer region at the release piston 26 and slides in a displaceable manner against the wall 32. Further, the release piston 26 is fixedly coupled on the radial inside with a release bearing 42 which has a displacing part 44 that is tightly sealed with the wall 36 by a sealing ring element 46. The release bearing 42 further comprises two bearing shells 48, 50 between which are arranged bearing balls 52. Bearing shell 48 is coupled with the displacing part 44 and the release piston 26 and bearing shell 50 is rotatable about the axis of rotation A with respect to these structural component parts and cooperates with the spring tongues 56, shown only schematically, of a diaphragm spring or dish spring or the like for releasing the clutch.

It is noted that the release mechanism 10 in the present embodiment is constructed to cooperate with a pressed clutch, but it would be possible to modify the mechanism 10 for cooperation with a pulled clutch without extensive structural changes.

The valve arrangement 14 is constructed in the manner of a pressure balance. A valve slide 60 is slidably received in a bore hole or opening 58 in the housing 12. The valve slide 60 is pretensioned toward the inside by a pretensioning spring 62 and is supported toward the inside by a flange 65 at a shoulder 67 of the opening 58. The pretensioning spring 62 is supported externally at a first closure piece 64 which is substantially cup-shaped and firmly inserted into the opening 58. The first closure piece 64 has an opening 66 in its base and a valve body 70 sits over this opening 66 under the pretensioning of a spring 68. The spring 68 is supported externally at a second closure piece 72 which is firmly inserted into the first closure piece 64. The closure piece 72 has an opening 74 for intake of compressed air. The opening 74 is preferably in communication with a pneumatic system 200 for supplying compressed air.

The slide 60 has an opening or bore hole 76 which opens outward and, on the inner side, opens toward a circumferential groove 82 via opening portions 78, 80. In the position shown in FIG. 2, the circumferential groove 82 is aligned with a vent opening 84 or overlaps the latter in the radial direction. Seal elements 86, 88 are provided inside and outside of the circumferential groove 82 and tightly close or seal the circumferential groove 82. The inner area of the slide 60 defines a hydraulic chamber 90 which can be connected to a hydraulic actuation system 202 via a hydraulic line 92 penetrating the housing 12. This hydraulic actuation system 202 may comprise, for example, a master cylinder which is coupled with the clutch pedal and by means of which hydraulic fluid is introduced into the hydraulic chamber 90 via the line 92 when the clutch pedal is pressed down. The hydraulic chamber 90 is in fluid communication with the measurement arrangement 16, i.e., with the cylinder 20 of the same, via a line portion 94. Further, a line 96 branching from the opening 58 at 98 is provided in the housing 12 and provides a fluid connection between an opening 98, indicated in dashed lines, and the cylinder chamber 38.

Figure 2:
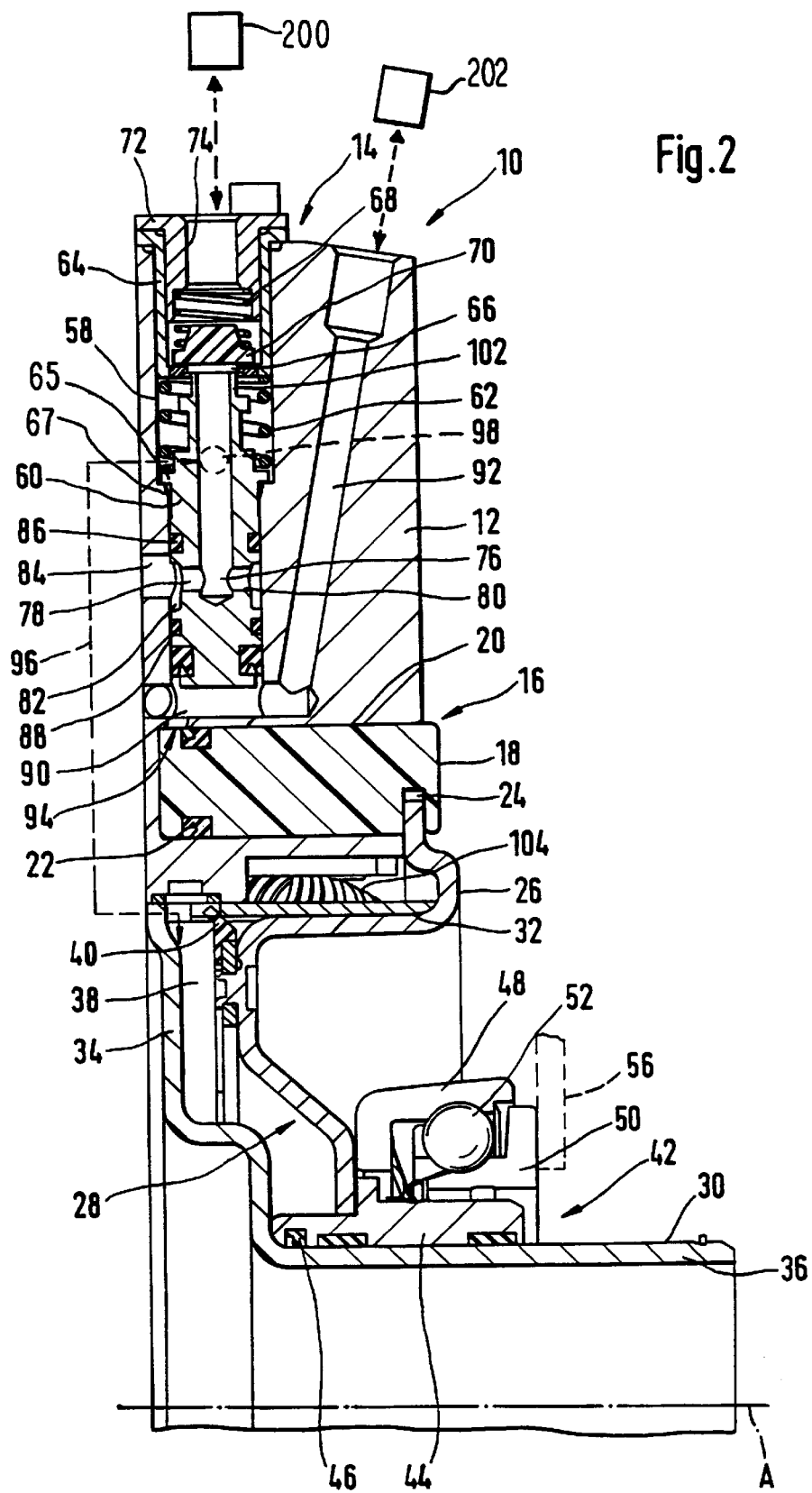
FIG. 2 is a partial longitudinal sectional view of a release mechanism for a motor vehicle friction clutch.

The manner of functioning of a release mechanism 10 constructed in the above-mentioned mentioned manner is described as follows:

In the engaged states of the clutch, the release piston 26, the measurement piston 18, the slide 60 and the valve body 70 are in the positions shown in FIG. 2; that is, the slide 60 is pretensioned in its innermost position, the cylinder chamber 38 communicates with the surroundings via the line 96, the opening 98, the annular space in the opening 58 surrounding the slide 60 above opening 98, the through-hole 66 in the first closure piece 64, the opening 76 in the slide 60, the line portions 78, 80, the circumferential groove 82 and the vent opening 84. There is no pressure in the cylinder chamber 38 by which the release piston 26 could be pressed to the right with respect to the view shown in FIG. 2.

When the clutch pedal is pressed down in order to carry out a release process and a determined volume of hydraulic fluid is accordingly displaced in the master cylinder, this displaced hydraulic fluid volume is conducted via line 92 into the hydraulic chamber 90 and, as a result, the slide 60 is displaced radially outwardly (or upwardly with reference to FIG. 2). In this respect, a portion 102 of the valve slide 60 which engages in or projects into the opening 66 in the first closure piece 64 sits on the valve body 70 and accordingly interrupts the above-described connection path between the cylinder chamber 38 and the vent opening 84. If the pressure is further increased, i.e., if more hydraulic fluid is displaced, the slide 60 now pushes the valve body 70 upward (i.e. radially outwardly), with reference to FIG. 2, against the pretensioning force of the spring 68, so that the opening 74 connected with the pneumatic system of the vehicle is connected with the opening 98 by releasing the opening 66, so that compressed air can flow into the cylinder chamber 38. The air pressure in the cylinder chamber 38 is accordingly increased and the release piston 26 is displaced to the right according to FIG. 2 against the pretensioning force of the diaphragm spring. The release piston 26 carries along the measurement piston 18, so that the hydraulic fluid contained in the hydraulic chamber 90 can now flow into the free space formed in the measurement cylinder 20. Since the flowing of hydraulic fluid into this space results in that the measurement piston 18 is pretensioned with respect to the release piston 26, a helical tension spring 104 is provided which acts between the housing 12 and the release piston 26 and opposes the pretensioning force tilting the release piston 26. In the bottom half of the release mechanism 10 which is not shown in the drawing, a helical pressure spring acting on the release piston 26 can be provided in a corresponding manner.

Since the hydraulic fluid which is under pressure can now flow out of the hydraulic chamber 90, the pressure in the hydraulic chamber 90 will decrease when the clutch pedal is held constant, so that the slide 60 will move downwardly or radially inwardly again, namely until the valve body 70 closes the through-hole 66 again. A state of equilibrium is then reached such that the slide 60, the release piston 26 and, therefore necessarily also, the measurement piston 18 retain their respective positions or locations.

It will be seen from the preceding description that the volume which is made available in the measurement arrangement by the displacement of the measurement piston 18 and in which the hydraulic fluid from the hydraulic chamber 90 is received is a measurement for the axial positioning of the release piston 26 and thus the release position. This means that with every determined pressure change in the actuation arrangement, e.g., in the master cylinder, which causes a displacement of a determined fluid volume in the direction of the hydraulic chamber 90, there is associated a predetermined volume of space created in the measurement arrangement 16 and a correspondingly predetermined release position of the release piston 26. The valve arrangement 14 regulates the supply of compressed air to the cylinder chamber 38 corresponding to the actual release position of the release piston 26 which is determined in this way and corresponding to the hydraulic fluid volume which is displaced by the master cylinder of an actuation arrangement; the hydraulic fluid volume is preferably employed as a reference variable. Finally, the valve arrangement 14 regulates the compressed air supply to the cylinder chamber 38 depending on the hydraulic pressure prevailing in the hydraulic chamber 90, which hydraulic pressure is determined in turn by the detected actual release position and the extent of actuation of the actuation arrangement (i.e., the reference variable).

When the actuation pedal is subsequently released, the hydraulic fluid contained in the hydraulic chamber 90 can flow out via the line 92, so that the slide 60 can now move farther inward and rise from the valve body 70 by its portion 102. The venting path described above is then opened so that the release piston 26 can move toward the left, with reference to FIG. 2, either into its moved position shown in FIG. 2 or again into a position which there is a state of equilibrium such as that described above.

If a release mechanism 10 of the type described above is to be used in connection with a transmission which has a subdivided stage for the switching steps, the measurement piston 18 which is shown in FIG. 2 is preferably replaced by a measurement piston 18' shown in FIG. 1. As was already mentioned, it is possible in transmissions of the kind mentioned above to displace the individual switching steps by means of selective activation or deactivation of the subdivided stage.

As depicted in FIG. 1, the measurement piston 18' shown in FIG. 1 has a piston housing 110 which comprises a base piece 112 and a wall piece 114 which corresponds to the housing 12 described above, i.e., is formed by the latter. These two pieces 112, 114 are fixedly connected and sealingly engaged with one another by a seal 116. The wall piece 114 has a flange portion 118 which projects radially inwardly. The flange 118 divides the measurement piston 18' into a measurement portion I and a switch portion II. In the measurement portion, an inner piston 120 is received so as to be displaceable along a longitudinal axis L of the measurement piston 18' and is guided in a sealed manner by a seal element 122 with respect to the wall piece 114. The hydraulic fluid can flow through an opening 124 (which corresponds to the opening 94 in FIG. 2) from the hydraulic chamber 90 shown in FIG. 2 into the measurement piston 18' when the inner piston 120 is displaced to the left with reference to FIG. 1, that is, toward the right with reference to the view shown in FIG. 2.

The inner piston 120 has an extension 126 which extends along the axis L and protrudes through the flange 118 and projects into the switch portion II. The flange 118 has a seal element 128 in sealing engagement with the extension 126. Three openings 130, 132 and 134 are formed in the switch portion II. Opening 130 is a vent opening through which compressed air can be released into the surroundings in a manner which will be described hereinafter. Opening 132 is a compressed air supply opening which is to be connected with a compressed air source such as, for example, the pneumatic system 200 of a vehicle. Opening 134 is an outlet opening through which compressed air, which is supplied through opening 132, can be communicated to the transmission for activating the shifting processes in a manner that will be described below.

Arranged in the switch portion II is a valve element 136 which is pretensioned in the direction of a valve seat 140 formed at the base piece 112 by a spring 138 supported at the flange 118. The valve element 136 is sealed by an annular seal element 142 with respect to the wall piece 114 and sits on the valve seat 140 with a seal element 144. Extension 126 of the inner piston 120 carries a valve actuation element 146 which is fixedly connected with extension 126 and is displaceable in the direction of the longitudinal axis L. The valve actuation element 146 has a sealing edge 148 by which it can come into contact with the seal element 144 of the valve element 136. It will be seen that a passage 150 is formed between extension 126 of the inner piston 120 and the valve element 136, so that in the shown position which corresponds to a fully engaged state of a clutch there is a connection between the opening 134 and the discharge opening 130, for which purpose the compressed air supply opening 132 is closed by the valve element 136.

Further, a coupling element 152 is received in the inner piston 120, which coupling element 152 is received in a friction fit in an opening 154 extending along the axis L. The inner piston 120 is coupled with the release piston 26 by the coupling element 152 for joint movement in the direction of the axis of rotation A.

When a clutch release process is carried out, the release piston 26 is displaced as was described above, wherein the displacement is toward the left with reference to the view in FIG. 1. The release piston 26 carries along the inner piston 120 via the coupling element 152, so that the hydraulic fluid can flow out of the hydraulic chamber 90 through the opening 124 into the cylinder chamber 156 which is now formed in the measurement piston 18'. It is assumed that the housing 112 of the measurement piston 18' is held in the cylinder opening 20 of the measurement arrangement 16 in the view in FIG. 2 or part 114 in FIG. 1 is formed by part 12 in FIG. 2. During this displacement movement, the valve actuation element 146 approaches the valve element 136. When the release piston 26 reaches a maximum release position, i.e. a predetermined switching threshold release position, the sealing edge 148 sits on the seal 144, so that the connection between the compressed air outlet opening 134 and the compressed air discharge opening 130 is interrupted. Further movement of the inner piston 120 in the direction of a maximum release position causes the valve element 136 to move toward the left with reference to the view in FIG. 1 by valve actuation element 146 and to separate from the valve seat 140. A fluid connection is then created between the compressed air feed opening 132 and the compressed air outlet opening 134, and the compressed air from the pneumatic system can flow via the openings 132, 134 and into a line 158. This line 158 leads to a shift initiating unit 160. The latter can be formed, for example, by a two-way valve. This shift initiating unit can receive shift commands via a signal line 164 from a switch 162 which is shown schematically in FIG. 1 and which can be switched between two positions by a driver of the vehicle corresponding to these two positions of the switch 162. This signal line can be constructed for the transmission of electric, hydraulic or pneumatic signals. The compressed air which is supplied via the line 158 and which now makes available the shifting force for the gear transmission is conducted by the shift initiating unit 160 in accordance with the selected position of the switch 162 into one of the two lines 166, 168 which are associated with the activation or deactivation of the shifting stage of the transmission 170. This means that, depending on the line 166, 168 in which the shifting force, i.e., the compressed air, is introduced by the shift initiating arrangement, the subdivided step is activated or deactivated, or the activation or deactivation is maintained.

When the release piston 26 is moved out of the area of the maximum release position again subsequently, i.e., when the inner piston 120 moves to the right with reference to the view in FIG. 1, the valve element 136 sits again on its valve seat 140, the valve actuation element 146 rises from the seal element 144 and the compressed air contained in the area of the line 158 can escape into the surroundings via the compressed air discharge opening 130. The transmission 170 then remains in the previously selected subdivided position.

The release mechanism according to the invention and the switching arrangement according to the invention for shifting the subdivided stage includes, without limitation, the following advantageous features:

1. The release position of the release piston, and therefore of the clutch, which is detected anyway or which is to be detected in the release mechanism is utilized to generate a signal for triggering the shifting of the subdivided stage.

2. This signal can be an electric control signal for an actuator or, as was described above, can be a pneumatic signal in the form of a shifting force generated by compressed air which is utilized in a suitable manner for actuating the transmission. Thus, the pneumatic system which is generally present in utility vehicles can be used for the shifting process.

3. A shifting process is carried out only when (1) the driver has actuated a corresponding switch and has therefore made it clear that the subdivided switching steps is to be changed, and (2) when it is detected that the clutch is in an area of a maximum release position and consequently the detection signal, in this case in the form of the shifting force, is conducted in the direction of the transmission.

4. Since the very accurately working hydraulic measurement arrangement is used for detecting the release position, in this case the maximum release position, it can be detected in a very exact and sure way when the clutch is in the release position suitable for triggering the shifting processes.

The measurement piston 18' described with reference to FIG. 1 also does not have the problem that its measurement results are impaired by wear of friction linings of a clutch. That is, when wear occurs during operation, the spring tongues of the diaphragm spring are displaced increasingly to the left with reference to the view in FIG. 2 corresponding to the wear when the clutch is pressed. As a result, the release piston 26 is moved increasingly toward the left also in the engaged state accompanied by a corresponding reduction in the cylinder chamber 38. FIG. 2 shows the maximum wear state, i.e., the cylinder chamber 38 has the smallest occurring volume. When the release piston is displaced in this way, the coupling element 152 is pressed increasingly farther into the opening 154 in the measurement piston 18' shown in FIG. 1, wherein the state of maximum wear, that is, the position of the coupling element 152 in which it is moved inward to the maximum extent, is shown in FIG. 1. This ensures that the inner piston 120 will traverse only the release path, and not the wear path which can amount to as much as 20 mm in truck clutches. This enables a reduction in the axial structural size of the measurement piston 18' (and creates the space for the additional accommodation of the switch).

It is noted herein that the measurement piston 18' shown in FIG. 1 is referenced in that way because it replaces the measurement piston 18 in FIG. 2 in terms of function. Nevertheless, the measurement piston 18', whose housing 112 is fixed to the housing 12 of the release mechanism 10, i.e., sits in the cylinder 20 or is formed by this housing 12 at least partially, forms a cylinder for the various components which are displaceable therein, especially for the inner piston 120.

The integration of the measurement piston 18' in the housing 12 is exemplarily illustrated in FIG. 3. It can be seen from FIG. 3 that part 114 of FIG. 1 is formed by the housing 12 as is the dividing wall or flange 118. Part 112 closes the cylinder opening. For the sake of clarity, the valve element 136 is not shown in FIG. 3.

It is further noted that the control of the transmission 170 shown in FIG. 1 can be carried out in different ways and need not necessarily be carried out by means of a two-way valve or the like.

The invention is not limited by the embodiments described above which are presented as examples only but can be modified in various ways within the scope of protection defined by the appended patent claims.

I claim:

1. A release mechanism for a motor vehicle friction clutch of a motor vehicle transmission having subdivided switching steps, comprising:

a release member displaceable by compressed air and configured to engage the motor vehicle friction clutch for carrying out clutch release processes, said release member having a reference release position;

actuation means for actuating said release member and providing a reference variable representing said reference release position of said release member;

measurement means for detecting an actual release position of said release member, said measurement means being operative to provide a shifting signal for shifting the transmission in said subdivided switching steps when the detected actual release position exceeds a predetermined switching threshold release position; and valve means for selectively supplying the compressed air to displace said release member in accordance with said reference variable provided by said actuation means and said detected actual release position of said measurement means.

2. The release mechanism of claim 1, wherein said shifting signal is representative of a shifting force for shifting the transmission in said subdivided switching steps.

3. The release mechanism of claim 2, wherein said measurement means comprises a switch device operatively arranged to adjustably supply pressure fluid for generating a shifting force depending on the detected actual release position.

4. The release mechanism of claim 3, wherein the switch device comprises:
   a pressure fluid inlet in fluid communication with a pressure fluid source;
   a pressure fluid outlet for communicating fluid from the pressure fluid source to the transmission; and
   a valve device for providing fluid communication between the pressure fluid inlet and the pressure fluid outlet when the detected actual release position exceeds the predetermined switching threshold release position.

5. The release mechanism of claim 4, wherein the valve device comprises:
   a valve element moveable between an open position at which the pressure fluid inlet and the pressure fluid outlet are in fluid communication, and a closed position at which fluid communication between the pressure fluid inlet and outlet is interrupted, said valve element being pretensioned to rest at its closed position; and
   a valve actuation element displaceable in accordance with the actual release position and which causes the valve element to move into said open position to thereby produce a pressure fluid connection between the pressure fluid inlet and the pressure fluid outlet when the detected actual release position exceeds said predetermined switching threshold release position.

6. The release mechanism of claim 4, wherein said valve device further includes a pressure fluid discharge outlet in fluid communication with the pressure fluid outlet for discharging pressure fluid from said switch device.

7. The release mechanism of claim 6, wherein said valve actuation element acts on the valve element when the valve actuation element reaches the predetermined switching threshold release position, to thereby interrupt a fluid connection between the pressure fluid discharge and the pressure fluid outlet, and when the valve actuation element is further displaced, the valve actuation element carries along the valve element against its pretensioning so as to produce a fluid connection between the pressure fluid inlet and the pressure fluid outlet.

8. The release mechanism of claim 4, wherein the pressure fluid is compressed air.

9. The release mechanism of claim 4, wherein said measurement means and said switch device are unitarily constructed.

10. The release mechanism of claim 1, further comprising wear compensation means associated with said measurement means for compensating clutch wear such that said measurement means is not impaired by the clutch wear.

11. The release mechanism of claim 10, wherein the measurement means has a measurement cylinder and includes a coupling element and a measurement piston displaceable in said measurement cylinder, said measurement piston being coupled to the release member by the coupling element, the coupling element being in frictional engagement with the measurement piston and displaceable relative to the measurement piston against the frictional engagement when wear occurs, wherein a volume limited by the measurement piston in the measurement cylinder corresponds to the actual release position.

12. The release mechanism of claim 11, wherein the valve device comprises:
   a valve element moveable between an open position at which the pressure fluid inlet and the pressure fluid outlet are in fluid communication, and a closed position at which fluid communication between the pressure fluid inlet and outlet is interrupted, said valve element being pretensioned to rest at its closed position; and
   a valve actuation element connected to the measurement piston and displaceable in accordance with the actual release position and which causes the valve element to move into said open position to thereby produce a pressure fluid connection between the pressure fluid inlet and the pressure fluid outlet when the detected actual release position exceeds said predetermined switching threshold release position.

13. The release mechanism of claim 1, wherein the predetermined switching threshold release position lies in an area of the maximum release position.

14. The release mechanism of claim 1, further comprising shift initiating means for transmitting a shift signal to the transmission in accordance with a shift command.

15. The release mechanism of claim 1, wherein the release member comprises an annular cylinder and a release ring piston movably disposed in said annular cylinder so as to be substantially concentric about an axis of rotation and displaceable along the axis of rotation.

16. The release mechanism of claim 1, wherein the actuation means comprises a hydraulic fluid system connected with the valve means and the measurement means, such that the valve means applies compressed air to the release member corresponding to the hydraulic fluid pressure prevailing in the hydraulic fluid system.

17. The release mechanism of claim 1, further comprising a transmission shifting switch arrangement for shifting a transmission by subdivided switching steps, the switch arrangement being unitarily constructed with said measurement cylinder means for detecting a release position of at least one of said actuation means and said release member, the transmission shifting switch arrangement comprising a valve unit for selectively supplying pressure fluid to the transmission for generating a shifting force.

18. The release mechanism of claim 17, wherein the pressure fluid is compressed air.

* * * * *